United States Patent
Chen et al.

(10) Patent No.: US 9,635,604 B2
(45) Date of Patent: Apr. 25, 2017

(54) SYSTEM AND METHOD FOR ONLINE SIGN UP PROVIDER SELECTION

(71) Applicant: Futurewei Technologies, Inc., Plano, TX (US)

(72) Inventors: Bin Chen, Schaumburg, IL (US); Hanan Ahmed, Belleville, MI (US); George Calcev, Hoffman Estates, IL (US); Kaidi Huang, Chengdu (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 144 days.

(21) Appl. No.: 14/552,291

(22) Filed: Nov. 24, 2014

(65) Prior Publication Data
US 2015/0078364 A1    Mar. 19, 2015

Related U.S. Application Data

(63) Continuation of application No. 13/647,292, filed on Oct. 8, 2012, now Pat. No. 8,913,559.

(60) Provisional application No. 61/669,992, filed on Jul. 10, 2012.

(51) Int. Cl.
*H04W 48/16* (2009.01)
*H04W 48/18* (2009.01)
*H04W 8/18* (2009.01)
*H04W 48/14* (2009.01)

(52) U.S. Cl.
CPC ........... *H04W 48/16* (2013.01); *H04W 48/18* (2013.01); *H04W 8/18* (2013.01); *H04W 48/14* (2013.01)

(58) Field of Classification Search
CPC ... H04W 48/16; H04W 48/20; H04W 74/002; H04W 74/006
See application file for complete search history.

(56) References Cited

U.S. PATENT DOCUMENTS

| 2012/0072976 A1 | 3/2012 | Patil et al. |
| 2013/0070644 A1* | 3/2013 | McCann ............ H04W 76/021 370/255 |
| 2013/0308445 A1 | 11/2013 | Xiang et al. |

(Continued)

FOREIGN PATENT DOCUMENTS

| CN | 101001439 A | 7/2007 |
| EP | 2424192 A2 | 2/2012 |
| WO | 2006043956 A1 | 4/2006 |

OTHER PUBLICATIONS

Extended European Search Report received in European Application No. 13816653.3 dated Jul. 7, 2015, 8 pages.
(Continued)

*Primary Examiner* — Benjamin H Elliott, IV
(74) *Attorney, Agent, or Firm* — Slater Matsil, LLP

(57) ABSTRACT

A mobile station selects a provider such as an online sign up (OSU) provider by receiving a pre-association message including OSU selection information from a Wi-Fi network component, such as an access point in communication with the OSU provider, and sending a selection of an OSU provider in accordance with the OSU selection information to the network component. The OSU selection information excludes identification of the OSU network provider or resource, but provides other attributes to the user, such as price or service configuration. The pre-association message may be transmitted as a beacon or using ANQP.

20 Claims, 7 Drawing Sheets

46

| MEANING | VALUE |
|---|---|
| VIDEO ON DEMAND | 0 |
| VIDEO STREAMING | 1 |
| CLOUD STORAGE | 2 |
| MAIL | 3 |
| RESERVED | 4-255 |

(56) References Cited

U.S. PATENT DOCUMENTS

| | | | |
|---|---|---|---|
| 2013/0339478 A1* | 12/2013 | Edge ................... | H04L 67/16 |
| | | | 709/217 |
| 2014/0010222 A1* | 1/2014 | Chen ................... | H04W 48/16 |
| | | | 370/338 |
| 2014/0016628 A1* | 1/2014 | McCann ............... | H04W 4/001 |
| | | | 370/338 |
| 2015/0078364 A1* | 3/2015 | Chen ................... | H04W 48/16 |
| | | | 370/338 |

OTHER PUBLICATIONS

"Wi-Fi Roaming Building on ANDSF and Hotspot 2.0," Alcatel Lucent White Paper in collaboration with BT, 2012, 46 pages.

\* cited by examiner

FIG. 3

| OCTETS: | 2 | 2 | variable | 1 | variable | 1 | variable |
|---|---|---|---|---|---|---|---|
| | OSU PROVIDER LENGTH | OSU FRIENDLY NAME DUPLES LENGTH | OSU FRIENDLY NAME DUPLES | OSU_NAI LENGTH | OSU_NAI (OPTIONAL) | OSU SERVER URI LENGTH | OSU SERVER URI |

24

| OCTETS: | 1 | variable |
|---|---|---|
| | OSU METHOD | OSU SELECTION INFORMATION |

22

| ICONS AVAILABLE |
|---|
| variable |

FIG. 4

| OCTETS: | 2 | 2 | variable | 1 | variable | 1 | variable |
|---|---|---|---|---|---|---|---|
| | OSU PROVIDER LENGTH | OSU FRIENDLY NAME DUPLES LENGTH | OSU FRIENDLY NAME DUPLES | OSU_NAI LENGTH | OSU_NAI (OPTIONAL) | OSU SERVER URI LENGTH | OSU SERVER URI |

24

| OCTETS: | 1 | 1 | variable |
|---|---|---|---|
| | OSU METHOD | RELATIONSHIP OF OSU PROVIDER AND BSS | ICONS AVAILABLE |

22

32

| MEANING | VALUE |
|---|---|
| THIS OSU PROVIDER IS NOT THE MOST PREFFERED | 0 |
| THIS OSU IS THE MOST PREFERRED | 1 |
| RESERVED | 2-255 |

| MEANING | VALUE |
|---|---|
| THIS BSS IS THE OWN DEPLOYED BSS | 0 |
| THIS BSS IS NOT THE OWN DEPLOYED BSS | 1 |
| RESERVED | 2-255 |

| MEANING | VALUE |
|---|---|
| THIS OSU PROVIDER HAS THE HIGHEST PRIORITY | 0 |
| THIS OSU PROVIDER HAS THE SECOND HIGHEST PRIORITY | 1 |
| THIS OSU PROVIDER HAS THE THIRD HIGHEST PRIORITY | 2 |
| ⋮ | ⋮ |
| THIS OSU PROVIDER HAS THE TENTH HIGHEST PRIORITY | 9 |
| RESERVED | 10-255 |

| OSU PROVIDER LENGTH | OSU FRIENDLY NAME DUPLES LENGTH | OSU FRIENDLY NAME DUPLES | OSU_NAI LENGTH | OSU_NAI (OPTIONAL) | OSU SERVER URI LENGTH | OSU SERVER URI |
|---|---|---|---|---|---|---|
| 2 | 2 | VARIABLE | 1 | VARIABLE | 1 | VARIABLE |

OCTETS:

| OSU METHOD AND NUMNBER OSU ATTRIBUTES | OSU ATTRIBUTES | OSU ATTRIBUTES | ICONS AVAILABLE |
|---|---|---|---|
| 1 | 2 | 2 | VARIABLE |

OCTETS:

| OSU ATTRIBUTES TYPE | OSU ATTRIBUTE VALUE |
|---|---|
| 1 | 1 |

40   42

38

44

| MEANING | VALUE |
|---|---|
| SUBSCRIPTION COST PER TIME UNIT | 0 |
| SUBSCRIPTION COST PER DATA UNIT | 1 |
| AVAILABLE SERVICES | 2 |
| MINIMUM QoS | 3 |
| RESERVED | 4-255 |

| MEANING | VALUE |
|---|---|
| VIDEO ON DEMAND | 0 |
| VIDEO STREAMING | 1 |
| CLOUD STORAGE | 2 |
| MAIL | 3 |
| RESERVED | 4-255 |

FIG. 14

SYSTEM AND METHOD FOR ONLINE SIGN UP PROVIDER SELECTION

This patent application is a continuation of U.S. Non-Provisional application Ser. No. 13/647,292, filed on Oct. 8, 2012, entitled "System and Method for Online Sign Up Provider Selection," which claims priority to U.S. Provisional Application No. 61/669,992, filed on Jul. 10, 2012, entitled "System and Method for Online Sign Up Provider Selection," both of which are incorporated by reference herein as if reproduced in its entireties.

TECHNICAL FIELD

The present disclosure relates to a system and method for wireless communications, and, in particular embodiments, to a system and method for online sign up provider selection.

BACKGROUND

In Wi-Fi Alliance Hotspot 2.0 technical specification release 2 version 1.02, an online sign up (OSU) function is provided for users to sign up subscriptions (i.e., get subscriptions via online) via a Wi-Fi access network. Such functionality may be delivered to the users through a pre-association message such as, for example, a beacon or the Access Network Query Protocol (ANQP) message 10 (i.e., element) illustrated in FIG. 1. The ANQP message 10 includes a Hotspot OSU Providers list 12. The Hotspot OSU Providers list 12 incorporates information for one or more entities offering OSU service.

The format of the OSU Providers list 12 is shown in FIG. 2. For each OSU provider listed in FIG. 1, at least the following information is provided: their friendly name (in multiple human languages) 14, the network access identifier (NAI) 16 to be used to authenticate to the Wi-Fi access network (when configured for WPA2-Enterprise security), the universal resource identifier (URI) of their OSU Server 18, and their Icon(s) 20.

The mobile device (i.e., mobile station) uses the OSU NAI 16 to indicate its intention to access the network without peer authentication by using the OSU NAI 16 as its identity in the authentication process. One OSU Provider field 12 is always available if online sign-up is mandatory, as indicated by the Network Authentication Type.

SUMMARY

An embodiment method for online sign up (OSU) provider selection includes receiving, by a mobile station, a pre-association message, the pre-association message including OSU selection information, accepting, by the mobile station, a selection of an OSU provider in accordance with the OSU selection information, and connecting, by the mobile station, to a server of the OSU provider in accordance with the selection.

An embodiment method for online sign up (OSU) provider selection includes receiving, by a mobile station, a pre-association message, the pre-association message including an OSU provider identifier and OSU selection information, accepting, by the mobile station, a selection of an OSU provider in accordance with the OSU selection information, and connecting, by the mobile station, to a server of the OSU provider in accordance with the selection.

An embodiment method permitting online sign up (OSU) provider selection includes transmitting, by a network component, a pre-association message, the pre-association message including an OSU provider identifier and OSU selection information, and receiving, at the network component, a selection of an OSU provider in accordance with the OSU selection information.

An embodiment mobile station in a wireless fidelity (WiFi) network includes an antenna adapted to receive a pre-association message, the pre-association message including an OSU provider identifier and OSU selection information, and an input device adapted to permit selection of an OSU provider in accordance with the OSU selection information.

An embodiment controller in a wireless fidelity (WiFi) network includes an antenna adapted to transmit a pre-association message, the pre-association message including an OSU provider identifier and OSU selection information, and the antenna adapted to receive the selection of an OSU provider in accordance with the OSU selection information.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 3 illustrates the relationship between OSU provider and BSS;

FIG. 4 illustrates the relationship between OSU provider and BSS;

FIG. 8 illustrates an example of the relationship of OSU provider and BSS (most preferred OSU provider);

FIG. 9 illustrates an example of the relationship of OSU provider and BSS (own deployed BSS);

FIG. 10 illustrates an example of the relationship of OSU provider and BSS (priority order);

FIG. 11 illustrates an example OSU provider field format;

FIG. 12 illustrates OSU attributes;

FIG. 13 illustrates OSU attributes type;

FIG. 14 illustrates an example of value field for available services;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to preferred embodiments in a specific context, namely a wireless fidelity (Wi-Fi) wireless standard, which may also be known as IEEE 802.11. The concepts in the disclosure may also apply, however, to other types of communications standards for connecting electronic devices or access networks.

Figure 2:
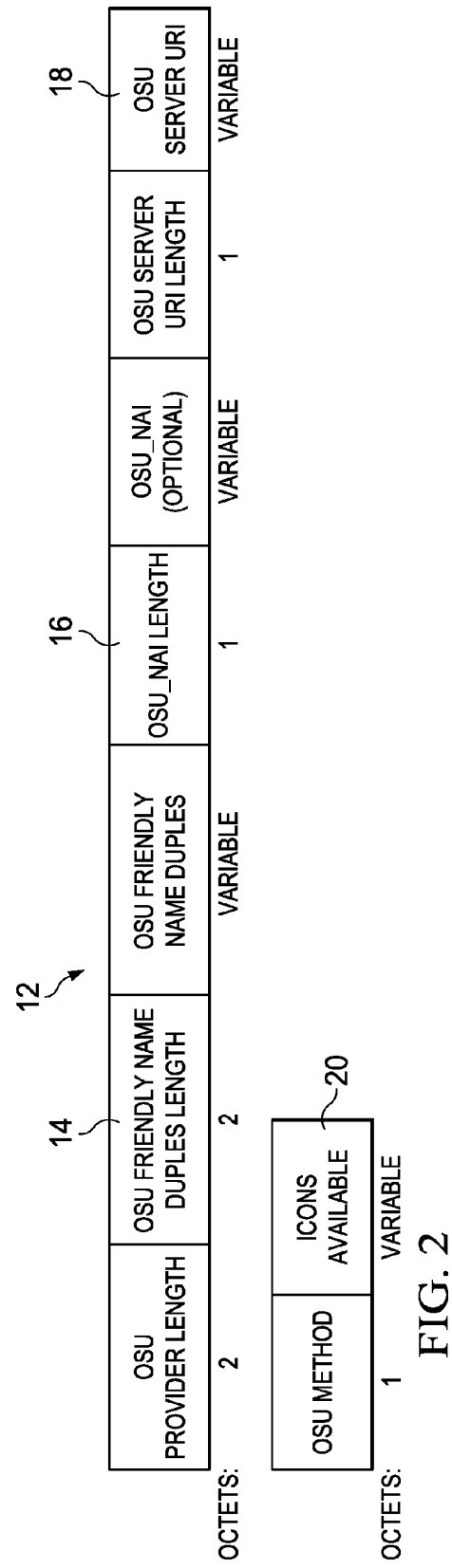
FIG. 2 illustrates the OSU Provider field format.

In the current WFA hotspot 2.0 release 2 standard, a user selects the OSU based on the information of the OSU NAI 16 as shown in FIG. 2, but this information generally is not enough. For example, a user may want to consider what type of additional services the OSU offers. Another example is that a user may want to access a basic service set (BSS) that is deployed by the OSU provider, which may provide the lowest price for service.

As used herein, the OSU provider may be a Wi-Fi provider or a Wi-Fi hotspot operator or may be another entity altogether. For example, the OSU service provider may provide network access service itself or operate a Wi-Fi hotspot. In contrast, if the OSU service provider has no Wi-Fi network the OSU service provider may borrow or rent a Wi-Fi network from a hotspot operator.

As will be more fully explained below, an embodiment method assists with selection of online sign up provider by providing some information via ANQP message or some other message. In an embodiment, the relationship between OSU provider and the BSS is set and sent to the user device from the network to user devices for helping select OSU provider to process online sign up. Embodiments may be implemented in Wi-Fi networks and user devices, such as a Wi-Fi access point (AP), a Wi-Fi station (STA), and the like.

An embodiment method provides additional information on OSU characteristics or OSU provider's characteristics or preference in some pre-association message (e.g., ANQP message or beacon), so that this information can be used by the user or user device to select the OSU provider to get a subscription. This information may be referred to as OSU selection information. As used herein, the OSU selection information excludes the following information pertaining to the OSU provider: their friendly name (in multiple human languages) 14, the network access identifier (NAI) 16 to be used to authenticate to the Wi-Fi access network (when configured for WPA2-Enterprise security), the universal resource identifier (URI) of their OSU Server 18, and their Icon(s) 20. In an embodiment, an OSU selection information field 22 is added to the ANQP message 24 as shown in FIG. 3. As shown in FIG. 4, the OSU selection information field 22 may indicate a relationship between OSU provider and BSS.

Figure 5:
FIG. 5 illustrates the relationship of OSU provider and BSS (most preferred BSS)
Figure 6:
FIG. 6 illustrates the relationship of OSU provider and BSS (own deployed BSS option)
Figure 7:
FIG. 7 illustrates the relationship of OSU provider and BSS (priority order option)

In an embodiment, the OSU selection information representing a type of relationship of OSU provider and BSS is sent via ANQP message 24 or some other element or message (e.g., beacon), more specially, via the "Hotspot Online Sign-Up (OSU) Providers list" (in FIG. 1) and "OSU Provider field" (in FIG. 2) element. The relationship may indicate whether this BSS (the one that is sending the ANQP element to the user device) is the OSU provider's most preferred BSS, or a priority value of this BSS for the OSU provider, and so on. An example is shown in FIG. 4 of relationship information being included in the OSU selection information field 22 of FIG. 3. Another example is provided in the table 26 of FIG. 5 (most preferred BSS), the table 28 of FIG. 6 (own deployed BSS option), and the table 30 of FIG. 7 (priority order option). The relationship defined in these tables are merely examples and do not limit other possible definitions of the relationship.

The OSU provider may set the relationship value based on its relationship with the BSS. For example, if this BSS is its own deployed BSS, it will set the highest priority for this BSS, or if this BSS operator gives the OSU provider a good price for a roaming agreement, it will set the second highest priority for this BSS, and so on. These are just some examples for how to set the relationship, but do not limit embodiments for other implementations of the relationship.

When the user device receives this information, the user device can show this information to the user for the user to select a suitable OSU provider, or the user device can select directly based on the configuration policy (e.g., the user sent the configuration policy to the user device to select the OSU provider of the highest priority BSS who has the best signaling strength).

In an embodiment, the BSS (operator) sets the relationship value based on its relationship with the OSU provider. For example, if this OSU provider is its operator, it will set the highest priority for this OSU provider, or if this OSU provider gives the BSS (operator) a good price for a roaming agreement, it will set the second highest priority for this OSU provider, and so on. Again, these are just some examples for how to set the relationship, but do not limit other embodiments with other relationships.

Figure 1:
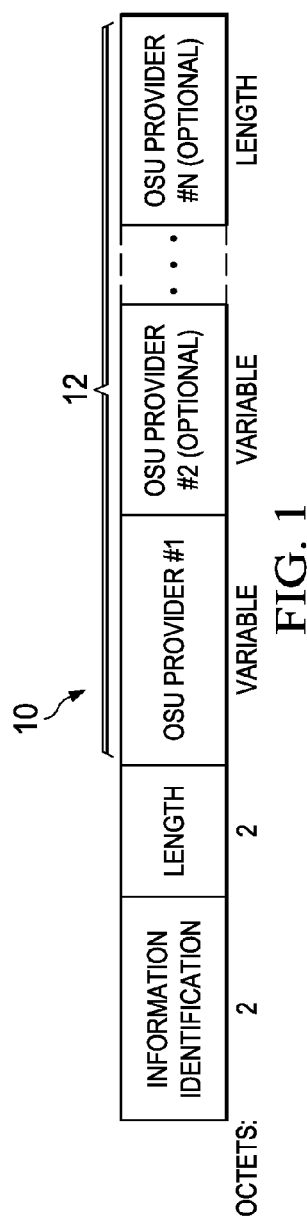
FIG. 1 illustrates the Hotspot Online Sign-Up (OSU) Providers list format within an ANQP message.

The relationship of OSU provider and BSS is sent via ANQP element or some other message (e.g., beacon), more specifically, via "Hotspot Online Sign-Up (OSU) Providers list" (in FIG. 1) and "OSU Provider field" (in FIG. 2) element. The relationship may indicate whether this BSS (the one that is sending the ANQP element to the user device) is the OSU provider most preferred BSS, or a priority value of this BSS for the OSU provider, and so on. An example is shown in FIG. 4 of relationship information being included in the OSU selection information field 22 of FIG. 3. Another example is provided in the table 32 of FIG. 8 (most preferred OSU provider), the table 34 of FIG. 9 (own deployed BSS), and the table 36 of FIG. 10 (priority order). A further example is shown in FIG. 1, where the OSU providers listed in the OSU provider list 12 element are listed by the order of their priority (e.g., OSU Provider #1, OSU Provider #2, . . . OSU Provider #N). When the user device receives this information, the user device can show the information to the user for the user to select a suitable OSU provider, or the user device can select directly based on the configuration policy.

In an embodiment, a Wi-Fi network component (could be an ANQP server, an AP, or AP controller or some other Wi-Fi component) provides additional information about each OSU, which information can be used by the user for OSU selection. Examples of such information are cost of subscription, access to various services, minimum quality of service (QoS) guaranteed, etc. The additional information is sent via ANQP message 10 or some other element or message (e.g., beacon), more specifically, via "Hotspot Online Sign-Up (OSU) Providers list" (in FIG. 1) and "OSU Provider field" (in FIG. 2) element in OSU attributes. FIG. 11 illustrates example OSU provider field 22 format (e.g., the OSU selection information field). FIG. 12 illustrates OSU attributes 38 within the OSU provider field 22. The OSU attributes 38 have the following structure: 1 byte the OSU attribute type 40, 1 byte the OSU attribute value 42.

In an embodiment, the information for the OSU selection in the OSU selection information field 22 can be a kind of introduction of the OSU provider (or service provider), or an advertisement from the OSU provider. This introduction or advertisement can be a kind of text transferred from the network to the user device (e.g., via ANQP message of Hotspot Online Sign-Up (OSU) Providers list format, or some other messages). For example, it can be as "the best user experience in the world with a lowest and flexible rate," or "it is a network from CMCC providing all over the world coverage and roaming." When the user device receives this information, it can show it to the user and wait for the user's input, or it can handle it by itself. For example, it can pick up key word and check the pre-configured key-word in itself. If the key word matches one of the pre-configured key words, it will handle it according to the pre-configured process link to the pre-configured key word.

FIG. 13 illustrates a OSU attributes type table 44. FIG. 14 illustrates an example table 46 with a value field for available services. Another example is that the available services are listed as a bit map and each bit indicates a service. When a bit is set to 1, it means that the OSU provider provides the corresponding service. When the user device receives the ANQP message it will display a list of OSU names, and optionally will display the OSU attributes to allow the user to make an information selection.

Figure 15:
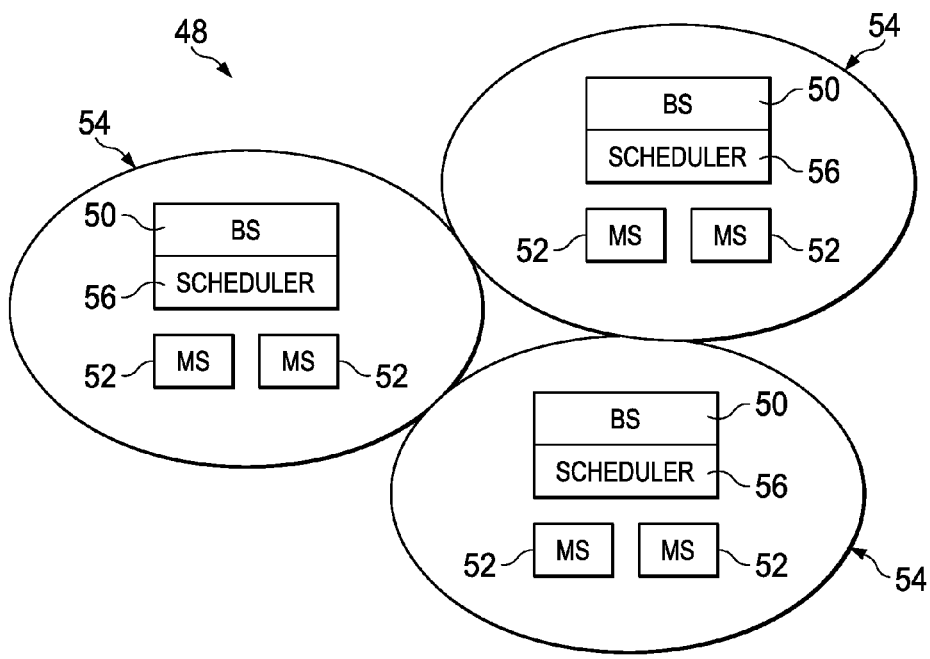
FIG. 15 illustrates a wireless communications network.

FIG. 15 illustrates a wireless cellular communications network 48 that preferably comprises a plurality of base stations (BS) 50 providing voice and/or data wireless communication service to a plurality of mobile stations (MS) 52. The BSs 50, which may also be referred to by other names such as access network (AN), cellular access point (AP), a cellular network communications controller, Node-B, etc., preferably downlink (DL) information to the MSs 52 while also receiving uplink (UL) information from the MSs 52. In an embodiment, the MS is smart phone has both Wi-Fi and cellular network communication connectivity.

Each BS 50 preferably has a corresponding coverage area 54. These coverage areas 54 represent the range of each BS 50 to adequately transmit data, and, while not necessarily shown, the coverage areas of adjacent BSs 50 preferably have some overlap in order to accommodate handoffs between BSs 50 whenever a MS 52 exits one coverage area 54 and enters an adjacent coverage area 54. Each BS 50 also preferably includes a scheduler 56 for allocating radio resources to the MSs 52.

Figure 16:
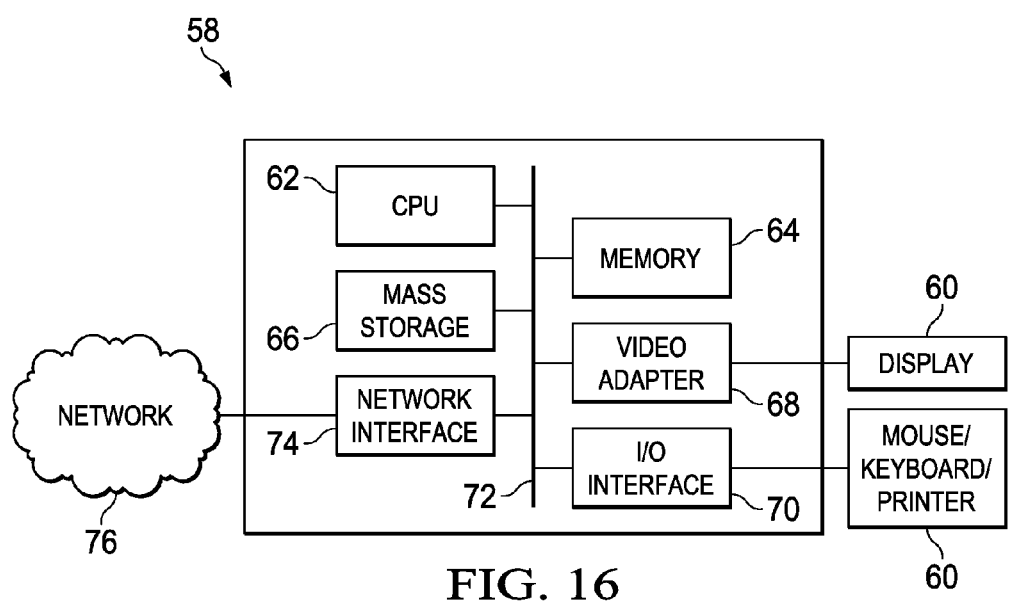
FIG. 16 is a block diagram illustrating a computing platform that may be used for implementing, for example, the devices and methods described herein, in accordance with an embodiment.

FIG. 16 is a block diagram of a processing system 58 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 58 may comprise a processing unit equipped with one or more input/output devices 60, such as a speaker, microphone, mouse, touchscreen, keypad, keyboard, printer, display, and the like. The processing system 58 may include a central processing unit (CPU) 62, memory 64, a mass storage device 66, a video adapter 68, and an I/O interface 70 connected to a bus 72.

The bus 72 may be one or more of any type of several bus architectures including a memory bus or memory controller, a peripheral bus, video bus, or the like. The CPU 66 may comprise any type of electronic data processor. The memory 64 may comprise any type of system memory such as static random access memory (SRAM), dynamic random access memory (DRAM), synchronous DRAM (SDRAM), read-only memory (ROM), a combination thereof, or the like. In an embodiment, the memory 64 may include ROM for use at boot-up, and DRAM for program and data storage for use while executing programs.

The mass storage 66 device may comprise any type of storage device configured to store data, programs, and other information and to make the data, programs, and other information accessible via the bus 72. The mass storage device 66 may comprise, for example, one or more of a solid state drive, hard disk drive, a magnetic disk drive, an optical disk drive, or the like.

The video adapter 68 and the I/O interface 70 provide interfaces to couple external input and output devices to the processing unit. As illustrated, examples of input and output devices include the display coupled to the video adapter 68 and the mouse/keyboard/printer coupled to the I/O interface 70. Other devices may be coupled to the processing system 58, and additional or fewer interface cards may be utilized. For example, a serial interface such as Universal Serial Bus (USB) (not shown) may be used to provide an interface for a printer.

The processing system 58 also includes one or more network interfaces 74, which may comprise wired links, such as an Ethernet cable or the like, and/or wireless links to access nodes or different networks. The network interface 74 allows the processing system 58 to communicate with remote systems or units via the networks. For example, the network interface 74 may provide wireless communication via one or more transmitters/transmit antennas and one or more receivers/receive antennas. In an embodiment, the processing system 58 (a.k.a., processing unit) is coupled to a local-area network 76 or a wide-area network 76 for data processing and communications with remote devices, such as other processing units, the Internet, remote storage facilities, or the like.

The following references are related to subject matter of the present application. Each of these references is incorporated herein by reference in its entirety:

WFA hotspot 2.0 release 2.

While the disclosure provides illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method for online sign up (OSU) provider selection, the method comprising:
   receiving, by a Wi-Fi enabled device, an access network query protocol (ANQP) message from a network server, the ANQP message comprising at least an OSU provider subfield specifying a uniform resource indicator (URI) associated with one or more services provided by an OSU provider, wherein the OSU provider subfield includes an OSU service description field that contains a service provider's description of a service being offered to the Wi-Fi enabled device; and
   establishing a connection between the Wi-Fi enabled device and a server of the OSU provider in accordance with information in the OSU provider subfield.

2. The method of claim 1, wherein the URI comprises a uniform resource locator (URL) associated with a venue of the OSU provider.

3. The method of claim 1, wherein the URI comprises a uniform resource locator (URL) specifying information particular to a venue of the OSU provider.

4. The method of claim 1, wherein the URI is associated with an advertising service.

5. The method of claim 1, wherein the URI is associated with a list of services.

6. The method of claim 1, wherein the OSU provider subfield includes an OSU provider length field, an OSU friendly name length field, an OSU server URI length field, an OSU method list length field, and an OSU network access identifier (NAI) length field.

7. The method of claim 6, wherein the OSU provider subfield includes an icons available field.

8. The method of claim 1, wherein the OSU provider subfield further includes an OSU provider length field, an OSU friendly name length field, an OSU friendly name field, an OSU server uniform resource identifier (URI) length field, an OSU method list length field, an OSU method list field, an icons available field, an OSU network access identifier (NAI) length field, and an OSU service description length field.

9. A Wi-Fi enabled device comprising:
- a processor; and
- a computer readable storage medium storing programming for execution by the processor, the programming including instructions to:
  - receive an access network query protocol (ANQP) message from a network server, the ANQP message comprising at least an OSU provider subfield specifying a uniform resource indicator (URI) associated with one or more services provided by an OSU provider, and wherein the OSU provider subfield includes an OSU service description field that contains a service provider's description of a service being offered to the Wi-Fi enabled device; and
  - establish a connection between the Wi-Fi enabled device and a server of the OSU provider in accordance with information in the OSU provider subfield.

10. The Wi-Fi enabled device of claim 9, wherein the URI comprises a uniform resource locator (URL) associated with a venue of the OSU provider.

11. The Wi-Fi enabled device of claim 9, wherein the URI comprises a uniform resource locator (URL) specifying information particular to a venue of the OSU provider.

12. The Wi-Fi enabled device of claim 9, wherein the URI is associated with an advertising service.

13. A method for online sign up (OSU) provider advertising, the method comprising:
- transmitting an access network query protocol (ANQP) message to a Wi-Fi enabled device, the ANQP message comprising at least an OSU provider subfield specifying a uniform resource indicator (URI) associated with one or more services provided by an OSU provider, wherein information in the OSU provider subfield prompts the Wi-Fi enabled device to establish a connection with a server of the OSU provider in accordance with information in the OSU provider subfield, and wherein the OSU provider subfield includes an OSU service description field that contains a service provider's description of a service being offered to the Wi-Fi enabled device.

14. The method of claim 13, wherein the URI comprises a uniform resource locator (URL) associated with a venue of the OSU provider.

15. The method of claim 13, wherein the URI comprises a uniform resource locator (URL) specifying information particular to a venue of the OSU provider.

16. The method of claim 13, wherein the URI is associated with an advertising service.

17. The method of claim 13, wherein the URI is associated with a list of services.

18. The method of claim 13, wherein the OSU provider subfield includes an OSU provider length field, an OSU friendly name length field, an OSU server URI length field, an OSU method list length field, and an OSU network access identifier (NAI) length field.

19. The method of claim 18, wherein the OSU provider subfield includes an icons available field.

20. The method of claim 13, wherein the OSU provider subfield further includes an OSU provider length field, an OSU friendly name length field, an OSU friendly name field, an OSU server uniform resource identifier (URI) length field, an OSU method list length field, an OSU method list field, an icons available field, an OSU network access identifier (NAI) length field, and an OSU service description length field.

* * * * *